US 011185088B2

(12) United States Patent
Brockmann

(10) Patent No.: US 11,185,088 B2
(45) Date of Patent: Nov. 30, 2021

(54) DEVICE AND METHOD FOR WORKING ON AND PROCESSING CHOCOLATE AS WELL AS USING A UNIVERSAL MACHINE THEREFORE

(71) Applicant: Stephan Machinery GmbH, Hameln (DE)

(72) Inventor: Gerhard Brockmann, Aerzen (DE)

(73) Assignee: STEPHAN MACHINERY GMBH, Hameln (DE)

( * ) Notice: Subject to any disclaimer, the term of this patent is extended or adjusted under 35 U.S.C. 154(b) by 119 days.

(21) Appl. No.: 16/161,391

(22) Filed: Oct. 16, 2018

(65) Prior Publication Data
US 2019/0110494 A1    Apr. 18, 2019

(30) Foreign Application Priority Data
Oct. 17, 2017   (DE) .................... 20 2017 005 365.9

(51) Int. Cl.
*A23G 1/12*   (2006.01)
*A23G 1/00*   (2006.01)
(Continued)

(52) U.S. Cl.
CPC ........... *A23G 1/125* (2013.01); *A23G 1/0036* (2013.01); *A23G 1/0043* (2013.01); *A23G 1/16* (2013.01);
(Continued)

(58) Field of Classification Search
CPC .... A23G 1/0036; A23G 1/0043; A23G 1/125; A23G 1/16; B01F 7/18; B01F 7/162; B01F 7/166; B01F 7/26
See application file for complete search history.

(56) References Cited

U.S. PATENT DOCUMENTS 499,890 A * 6/1893 Savage ................... A23L 7/187
366/185
2,825,542 A * 3/1958 Jackson .............. B01F 3/04539
261/87
(Continued)

FOREIGN PATENT DOCUMENTS

DE    1128271 B      4/1962
EP    1576888 A1     9/2005
WO    2016115557 A1  7/2016

OTHER PUBLICATIONS

European Search Report dated Feb. 8, 2019, directed to EP Application No. 18 00 0815; 2 pages.

*Primary Examiner* — Tony G Soohoo
(74) *Attorney, Agent, or Firm* — Michele V. Frank, Esq.; Venable, LLP

(57) ABSTRACT

The invention provides a device (1) for processing and treating chocolate, with a container (2) and stirring means (3) arranged therein, wherein the container (2) has a processing interior (2a) with a cylindrical wall (4) and an outwardly curved bottom (5) and is set up obliquely, i.e., the center axis (ZA) of the cylindrical wall (4) is inclined with respect to the vertical, and wherein the stirring means (3) comprises at least one stirring arm (7), which is rotatable about this center axis (ZA), while projecting from the center axis (ZA) of the cylindrical container (4) at least also in the radial direction, and a conching tool (6), which is rotatably arranged at or near the bottom (5) or the lowest vertical point of the container (2) about a an axis of rotation (DA), and wherein the conching tool (6) rotates faster than the stirring arm (7) during operation. In a method according to the invention for processing and treating chocolate, it is provided that a starting mass or an intermediate product of chocolate is filled in an inclined cylindrical container (2) and (Continued)

Figure 1:
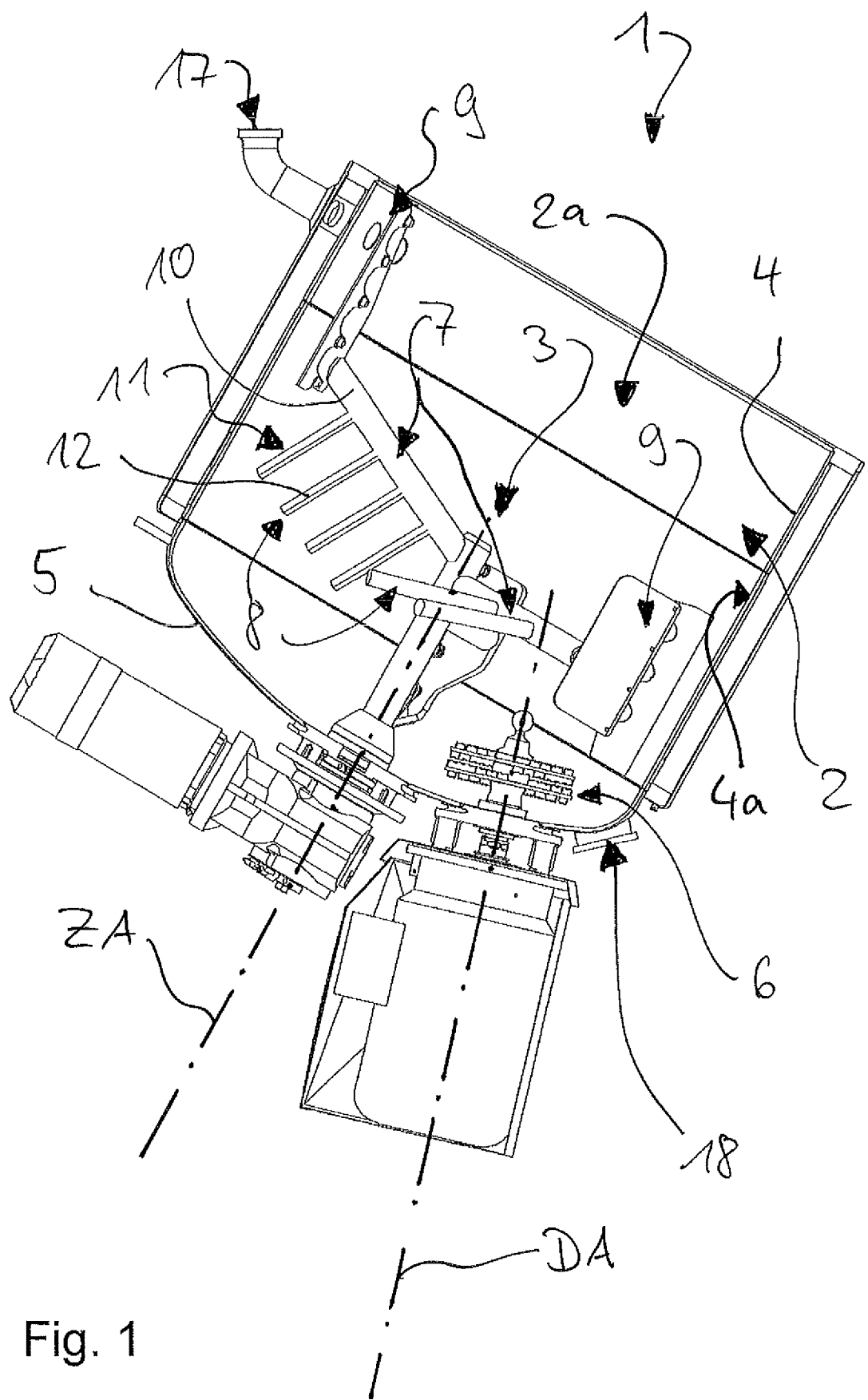

rotating therein along with at least one stirring arm (7), which rotates about this center axis (ZA), while projecting from the center axis (ZA) of the cylindrical container (2) at least also in the radial direction, as well as processed simultaneously by means of a rotatable conching tool (6), which rotates faster than the at least one stirring arm (7) about an axis of rotation (DA), which is inclined relative to the center axis (ZA) of the cylindrical container (2). Furthermore, the invention provides for the use of a universal machine for processing and treating nutritional and food products, processing and treating chocolate, wherein the universal machine comprises a container (2) and stirring means (3) arranged therein, and wherein the container (2) has a processing interior (2a) with a cylindrical wall (4) and an outwardly curved bottom (5), and arranged obliquely, i.e. the center axis (ZA) of the cylindrical wall (4) is inclined with respect to the vertical, and wherein the stirring means (3) comprise at least one stirring arm (7), which is rotatable about the center axis (ZA) of the cylindrical wall (4), while projecting from the center axis (ZA) of the cylindrical container (2) at least also in the radial direction, and wherein it is further provided that the stirring means (3) comprise a conching tool (6) rotatably arranged at or near the bottom (5) of the container (2), in particular at or near the lowest point of the container (2) with respect to the vertical, and rotating faster than the stirring arm (7) during operation.

15 Claims, 11 Drawing Sheets

(51) Int. Cl.
*A23G 1/16* (2006.01)
*B01F 7/16* (2006.01)
*B01F 7/18* (2006.01)
*B01F 7/26* (2006.01)
*B01F 7/00* (2006.01)

(52) U.S. Cl.
CPC ...... *B01F 7/00666* (2013.01); *B01F 7/00966* (2013.01); *B01F 7/162* (2013.01); *B01F 7/166* (2013.01); *B01F 7/1665* (2013.01); *B01F 7/18* (2013.01); *B01F 7/26* (2013.01)

(56) References Cited

U.S. PATENT DOCUMENTS

| | | | | |
|---|---|---|---|---|
| 3,395,897 | A * | 8/1968 | Kalich | B01F 7/16 366/6 |
| 3,531,092 | A * | 9/1970 | Praschak | B01F 15/00824 366/177.1 |
| 4,123,801 | A * | 10/1978 | Armanet | B01J 19/18 366/292 |
| 4,209,259 | A * | 6/1980 | Rains | B01F 13/0827 366/273 |
| 4,544,281 | A * | 10/1985 | Wilkinson | B01F 15/00 366/330.1 |
| 4,716,021 | A * | 12/1987 | Akiyama | B01J 3/04 366/315 |
| 5,200,220 | A * | 4/1993 | Capodieci | A23G 1/14 426/231 |
| 6,568,844 | B1 * | 5/2003 | Årthun | B01F 7/005 366/274 |
| 7,815,362 | B2 * | 10/2010 | Myhrberg | B01F 3/0853 366/273 |
| 8,167,480 | B2 * | 5/2012 | Myhrberg | B01F 7/163 366/273 |
| 8,303,913 | B2 * | 11/2012 | Haberkorn | C12M 45/02 422/536 |
| 8,678,639 | B2 * | 3/2014 | Tolle | B01F 3/18 366/200 |
| 9,968,897 | B2 * | 5/2018 | Tolle | B01F 3/18 |
| 2015/0290607 | A1 * | 10/2015 | Tolle | B01F 13/105 366/199 |

* cited by examiner

Fig. 10a
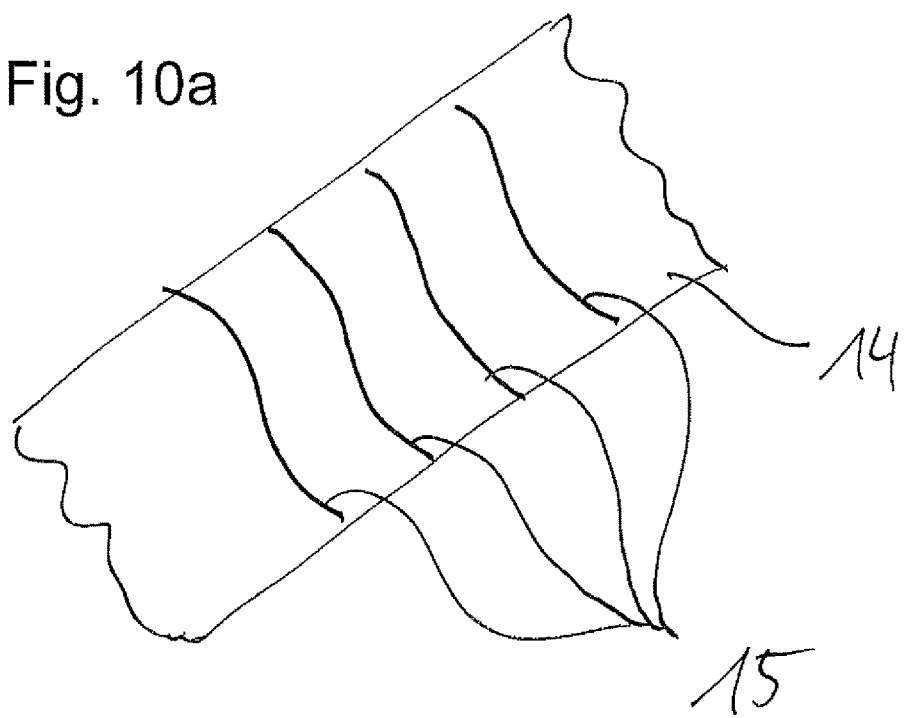
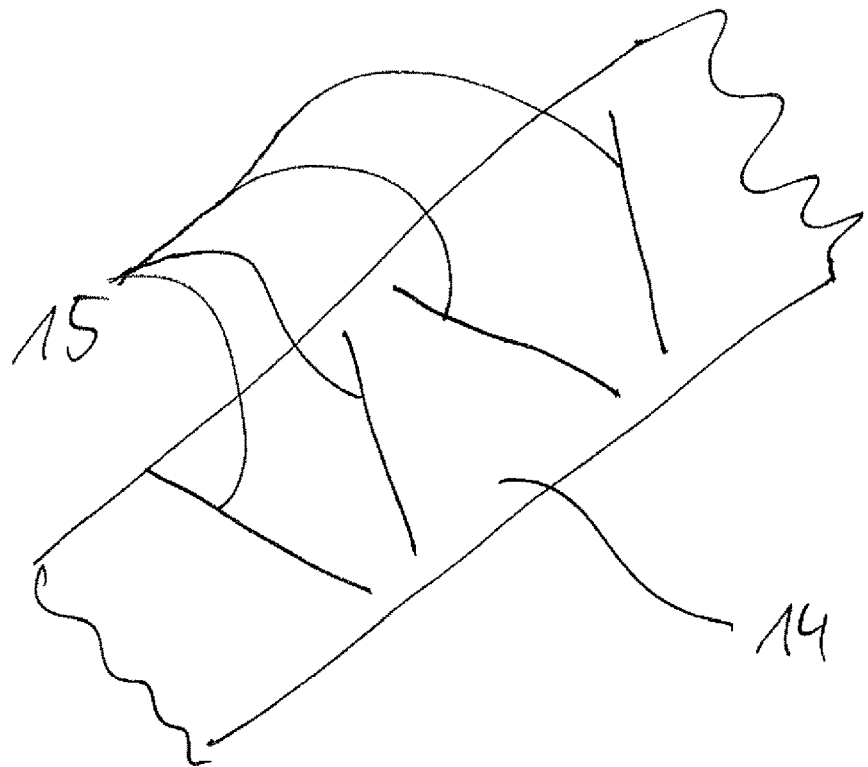
Fig. 10b

DEVICE AND METHOD FOR WORKING ON AND PROCESSING CHOCOLATE AS WELL AS USING A UNIVERSAL MACHINE THEREFORE

The invention relates to a device and a method for processing and treating chocolate. The invention also provides for the use of universal machines for processing and treating nutritional and food products, i.e., in particular heating, mixing, stirring, kneading and crushing equipment, and the like, for processing and treating chocolate.

Prior art teaches how to conch such a chocolate mass in order to produce a high-quality chocolate mass. Conching is done in a shell-shaped container, a so-called conche (from Latin "concha," meaning a "shell"). The chocolate powder produced therein, in particular by fine rolling, is vigorously kneaded, mixed, aerated and finally liquefied.

In so-called dry conching, which represents an initial conching phase, the water content is reduced, while unwanted flavor components escape and form new ones. The still fine-crumbled rolling stock is continuously circulated in large conches, whereby frictional heat is generated and additional heating takes place, such that the contained cocoa butter begins to melt and the powdery rolling stock acquires a granular, crumbly structure. This is followed by a processing phase, in which the chocolate gradually becomes viscous and becomes even more flowable through subsequent addition of in particular cocoa butter and lecithin, thereby starting the liquefaction phase, in which all non-fatty substances, such as sugar and non-fat milk powder, are completely covered with cocoa butter. It is critical to maintain an exact temperature profile, otherwise small lumps may form. The finished chocolate mass is then preferably cooled to about 45° C. and stored temporarily in large tanks under gentle stirring until further processing.

In conventional chocolate production, final conching is the final processing stage, i.e., a final conching phase. This is where the specific chocolate taste develops, and the flavors of all the ingredients develop fully in the chocolate mass. This refining process can take up to 24 hours, depending on the type of chocolate.

In production plants intended exclusively for chocolate production, special devices or machines are available for final conching, and may also be used to full capacity. However, food industry companies involved in the treatment of various food and raw materials, including the production of various foods and beverages using, using in particular, heating, mixing, stirring, kneading and crushing equipment, etc., have a need to manage without special equipment, i.e., specifically regular conches, and be able to use already existing or basically versatile equipment and devices. However, purely chocolate manufacturing companies also have a need to process other foods and raw materials and produce, e.g., different non-chocolate creams and pastes as fillings in chocolate products, which is not possible with regular conches.

The object of the invention is therefore to provide a device for processing and treating chocolate, and may easily be converted and/or redesigned in order to process and treat various other foods and raw materials, as well las be used in the production of various foods and beverages.

This object is achieved by a chocolate-processing and treatment device according to claim 1, comprising a container and stirring means arranged therein, wherein the container has a processing interior with a cylindrical wall and an outwardly curved bottom and positioned obliquely, i.e., the center axis of the cylindrical wall is inclined with respect to the vertical, wherein the stirring means comprise at least one stirring arm, which is rotatable about this center axis, while projecting from the center axis of the cylindrical container at least also in the radial direction, and a conching tool rotatably arranged about an axis of rotation at or near the bottom or the lowest point of the container with respect to the vertical, and wherein the conching tool rotates faster than the stirring arm during operation.

The high-speed conching tool, which runs opposite the stirring arm, ensures fast and high input of friction and shearing energy and thus heating and liquefaction (melting) of the chocolate mass. For the treatment of foods and raw materials other than chocolate, the conching tool can be easily replaced, e.g., by a knife. The stirring arm is responsible for mixing, kneading (sloshing) and aerating the chocolate mass, during the processing and treatment of chocolate in connection with the inclined container, but may also be used without further changes for mixing, kneading (sloshing) and aerating other food and raw materials. The product or chocolate mass or parts thereof are raised above each stirring arm and drop back into the residual mass due to gravity.

In particular, the axis of rotation of the conching tool and the axis of rotation of the stirring arm(s) coinciding with the center axis of the container are not parallel.

In yet another preferred embodiment, the conching tool is arranged deeper in the container than is each stirring arm. In particular, the conching tool is arranged in the inclined container at or near the lowest point with respect to the vertical.

Preferably, a plurality of stirring arms, in particular three stirring arms, are contained circumferentially, and in particular, evenly distributed. Alternatively or additionally, each stirring arm is preferably provided with mixing/dividing tools, which project from the rotation plane of the stirring arm. Advantageously, each stirrer arm, at its off-axis end toward the cylindrical wall of the container, comprises a scraper, which is particularly adapted to wipe along the inside of the cylindrical wall, and wipe or scrape product contained in the container from the interior of the cylindrical wall.

Due to the mixing/dividing tools and/or the scraper in combination with the inclined container, mixing, kneading (sloshing) and aeration of the chocolate mass by rotationally moving each stirring arm is further improved, however, mixing, kneading (sloshing) and aerating other food and raw materials without any further changes is also possible. The product or chocolate mass or parts thereof are additionally raised above the mixing tools and scrapers or scraper paddles, and fall back into the residual mass due to gravity.

The conching tool preferably comprises a rotatable blade, upon which rib formations or ribs are more preferably provided, and which project from the plane of rotation of the conching tool. Furthermore, it may preferably be provided that the ribs be arranged at an angle, in particular an acute angle, relative to the tangent of each circle described by them during the rotation of the blade, such that they force the surrounding chocolate mass radially outwardly upon rotation of the blade. Alternatively, or additionally, the ribs or web shapes may be planar, wavy or stepped along their length and/or have smooth or profiled free edges facing away from the respective blade. What's more, the ribs may be arranged in parallel or at angles to one another.

It is furthermore preferred that the blade of the conching tool, on either side of its axis of rotation, extends in blade arms extending diametrically opposed to the latter. Furthermore, and still more preferably, two blades may be contained, in particular, in a cross arrangement and arranged in the axial direction of the axis of rotation of the conching tool at a distance or adjacent thereto.

Advantageously, the container also contains a lid, which is adjustable between a closed position and open positions, which allows for tight closure of the container, such that the influences of external air, external temperature, etc., may be reduced or avoided.

If necessary, the container of the device for processing and treating chocolate is charged via the opened lid or feed systems. Emptying is preferably achieved via a bottom seat valve in or near the bottom of the container. Odor, bitter and flavor components may be removed from the product via a vacuum system. The container may also be heated or generally temperature-controlled. Controls or a central control may be provided for any components and functions of the device.

The invention also provides a method for processing and treating chocolate by operating the chocolate-processing and treatment device according to the invention in keeping with its intended purpose and design.

As the device for processing and treating chocolate is based on a universal machine for processing and treating other food and raw materials, such a universal machine may be used as a device for processing and treating chocolate by simply designing or adapting the control and/or using a conching tool instead of, e.g., knives.

In the inventive method according to claim 14, an initial mass or an intermediate product of chocolate is filled in an inclined cylindrical container and processed therein with at least one stirring arm, which rotates about the center axis of the cylindrical container and projects therefrom at least also in the radial direction, and is likewise processed simultaneously by means of a rotatable conching tool, which rotates faster than the at least one stirring arm about an axis of rotation, which is inclined with respect to the center axis of the cylindrical container. Advantageous further embodiments of this method result from the application and implementation of the various embodiments of the device for processing and treating chocolate.

Furthermore, the present invention provides for the use of a universal machine for processing and treating nutritional and food products according to claim 15, wherein the universal machine comprises a container and stirring means disposed therein, the container having a processing interior with a cylindrical wall and an outwardly curved bottom and being inclined, i.e., the center axis of the cylindrical wall is inclined with respect to the vertical, and wherein the stirring means comprise at least one stirring arm, which is rotatable about the center axis of the cylindrical wall and projects from the center axis of the cylindrical container at least also in the radial direction. Moreover, the invention provides that the stirring means further comprise a conching tool, which is arranged rotatably at or near the bottom of the container, in particular at or near the lowest point of the container with respect to the vertical, and which rotates faster the stirring arm during operation.

Further advantageous embodiments for using the universal machine for processing and treating chocolate in the processing and treatment of nutritional and food products result from the corresponding implementation of the above embodiments of the device for processing and treating chocolate.

Further preferred and/or advantageous embodiments of the invention and their individual aspects will become clear by combining the individual claims, as well as from all of the present application documents.

Figure 2:
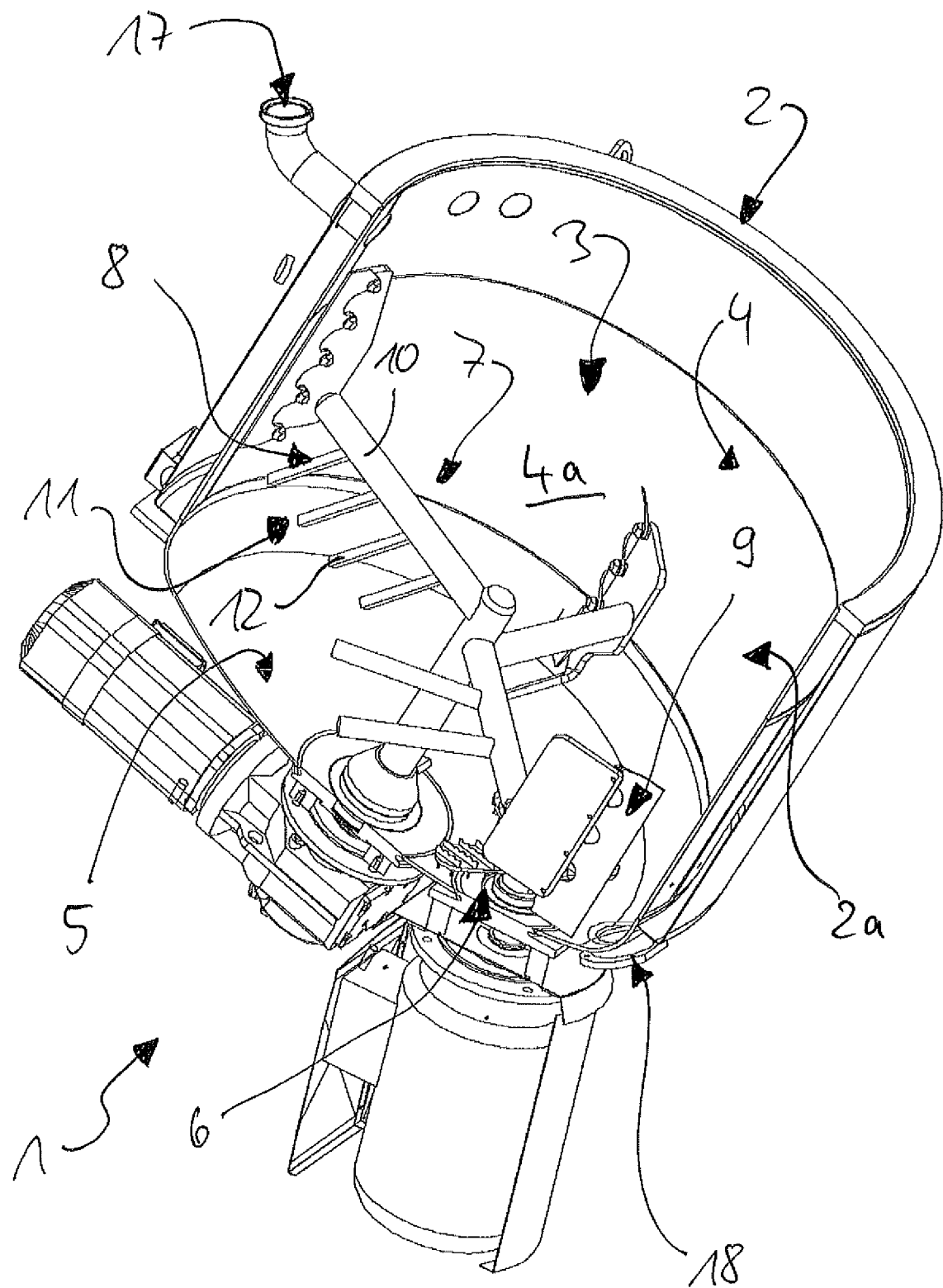
Figure 3:
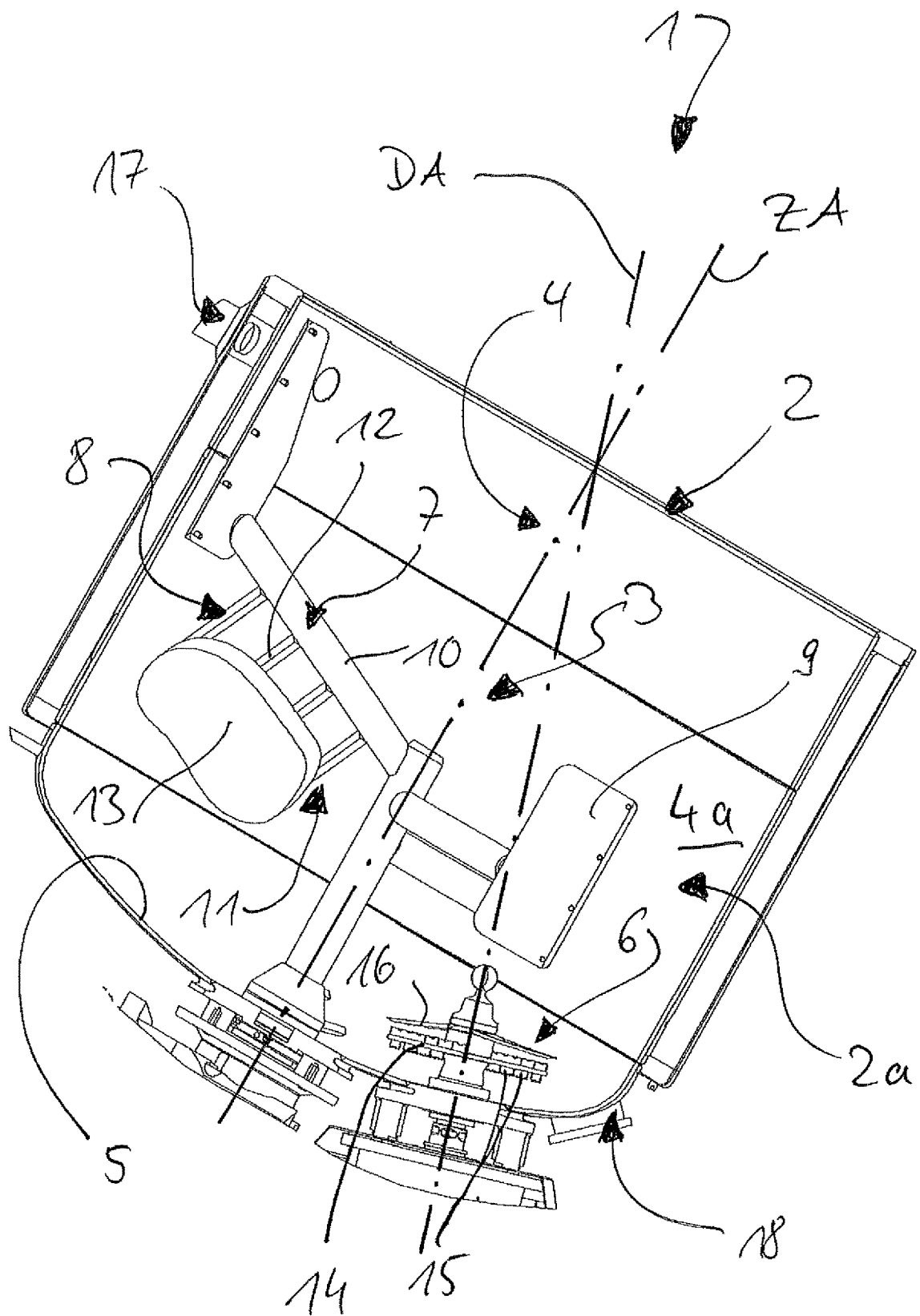
Figure 4:
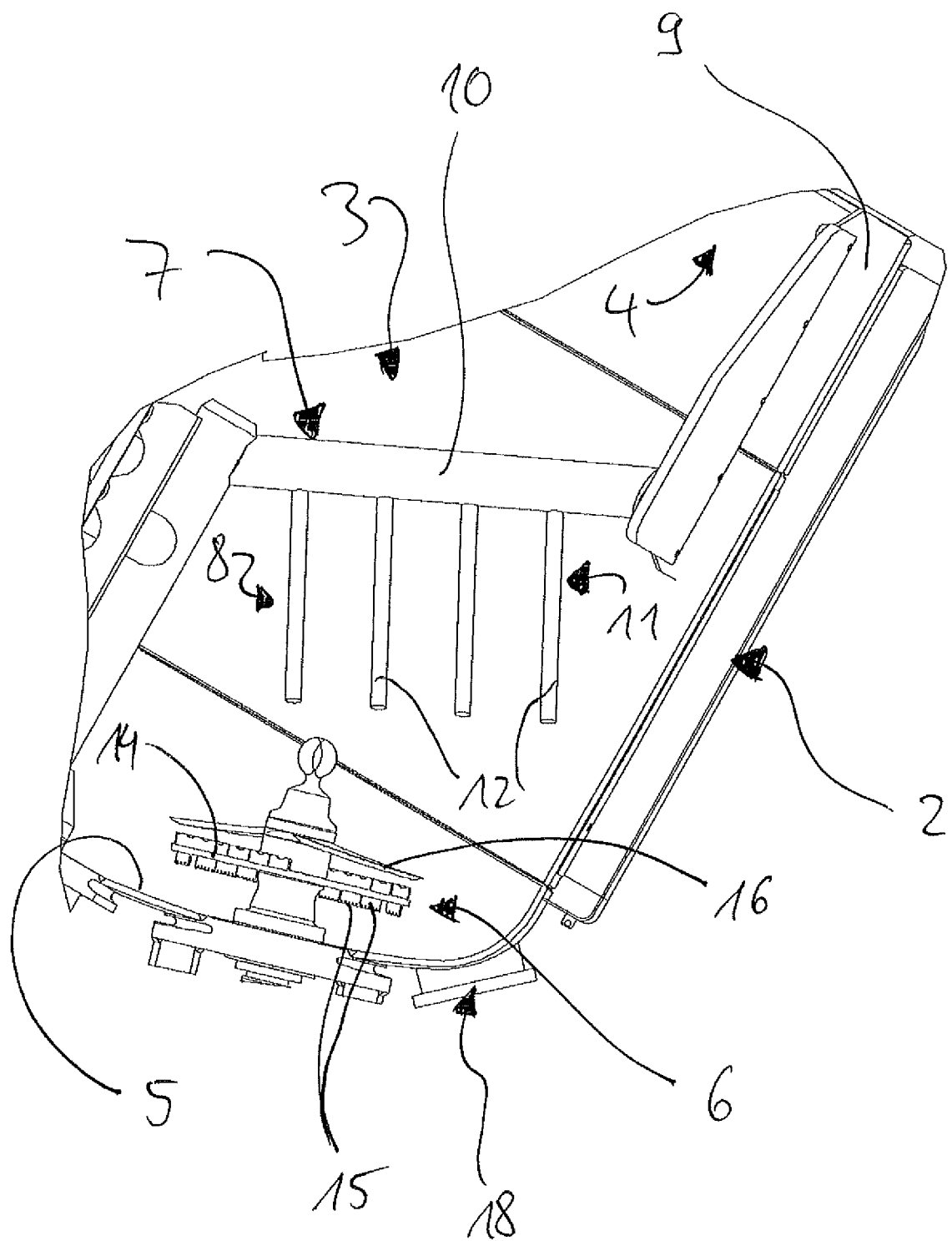
Figure 5:
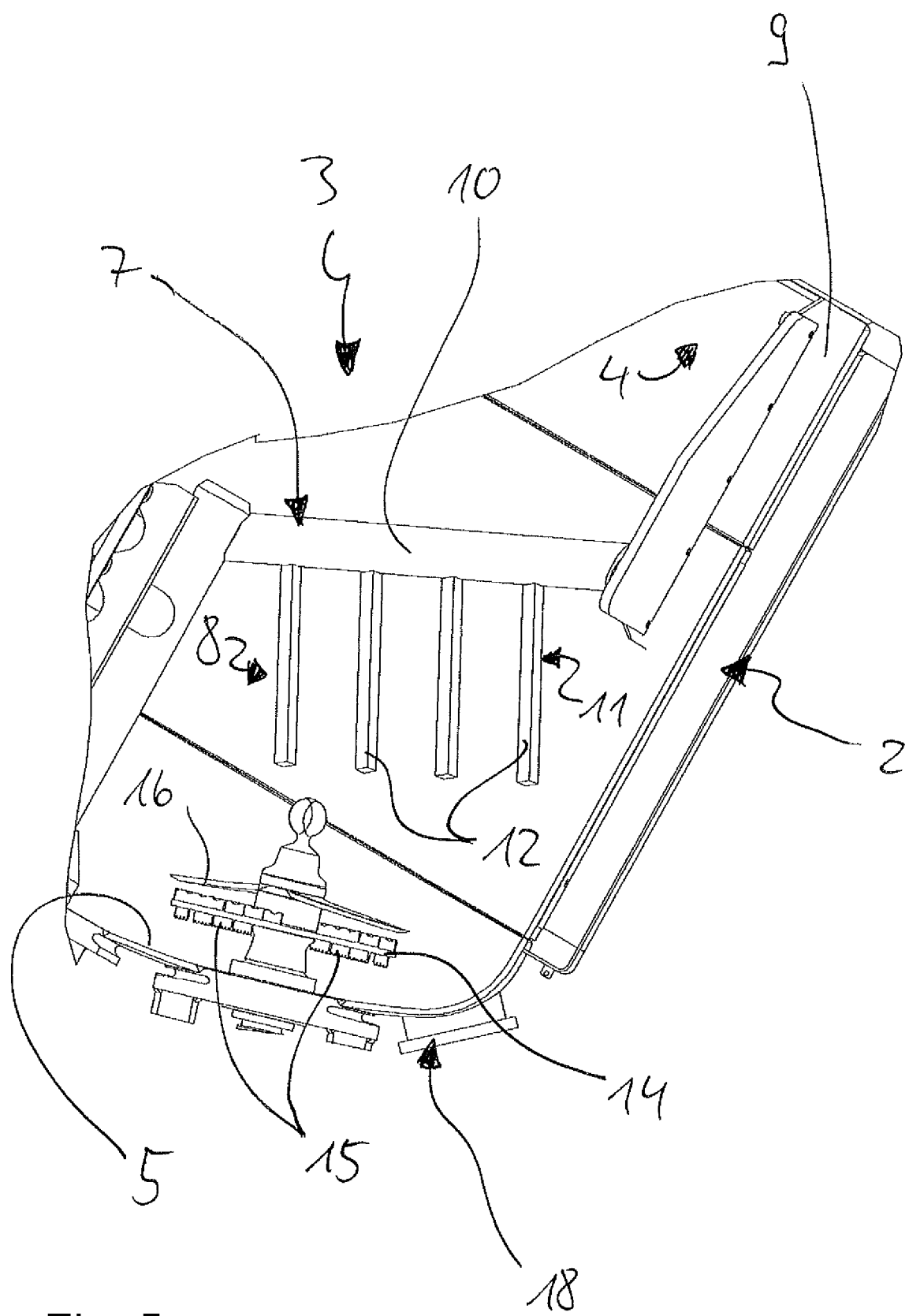
Figure 6:
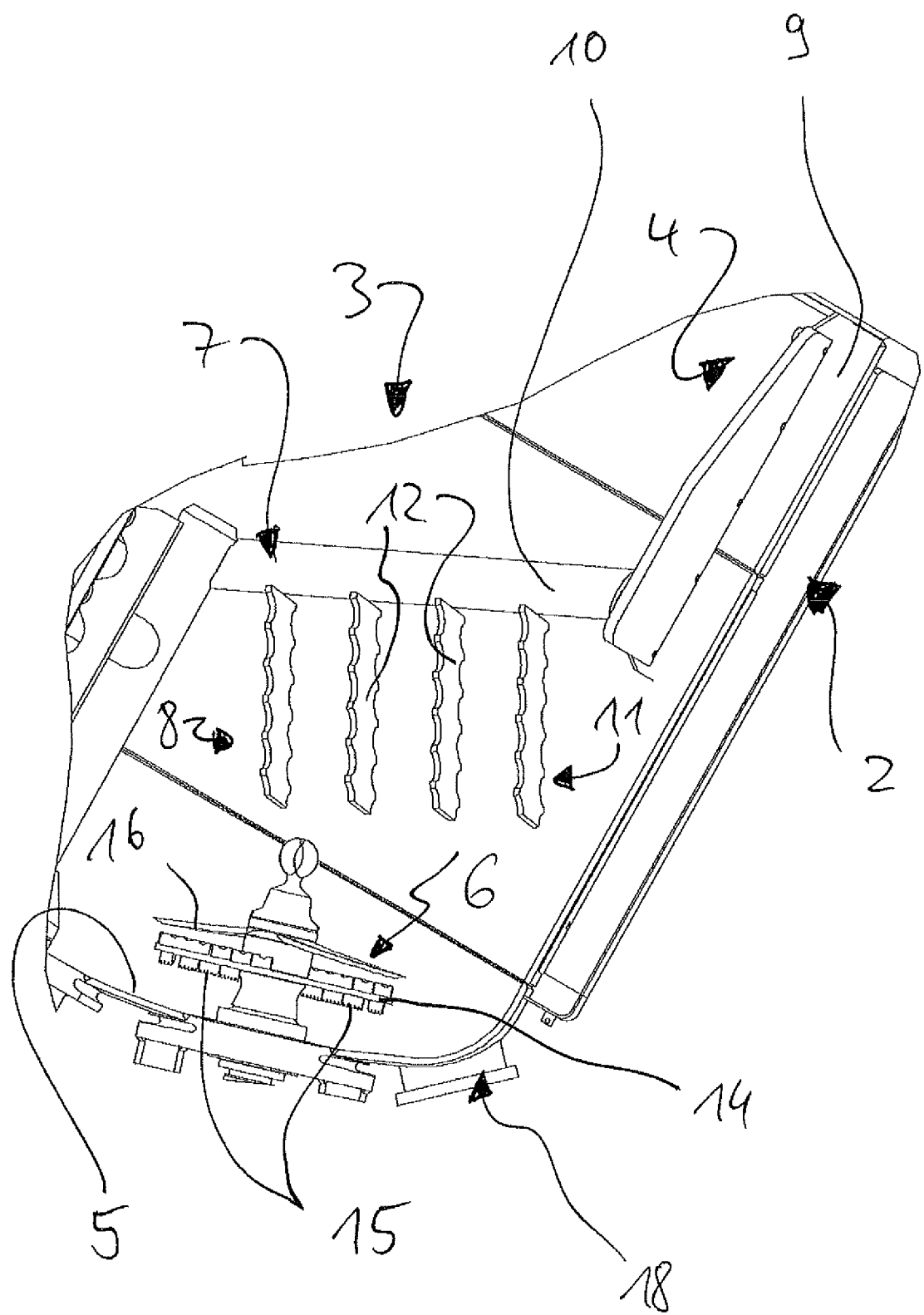
Figure 7:
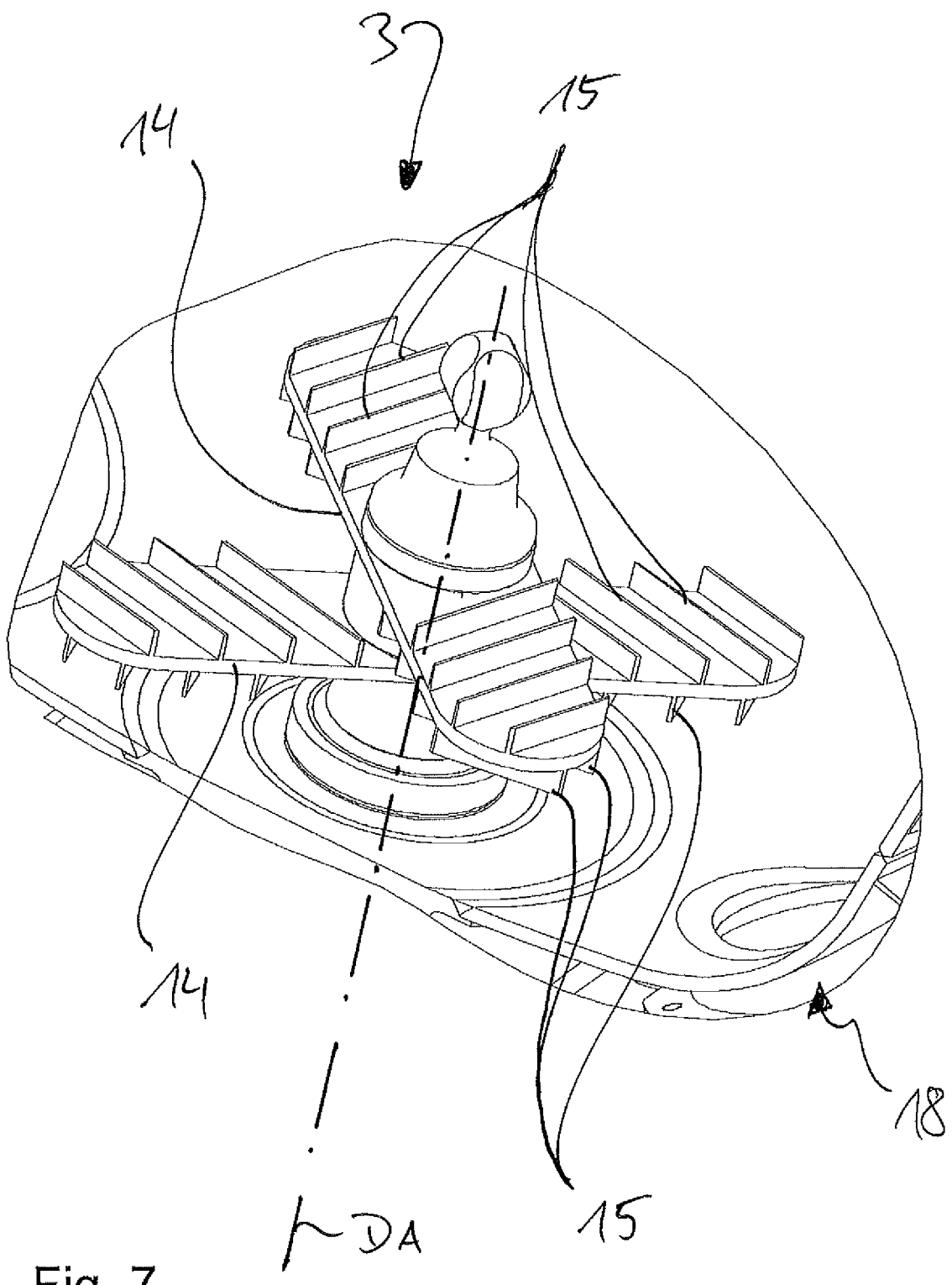
Figure 8:
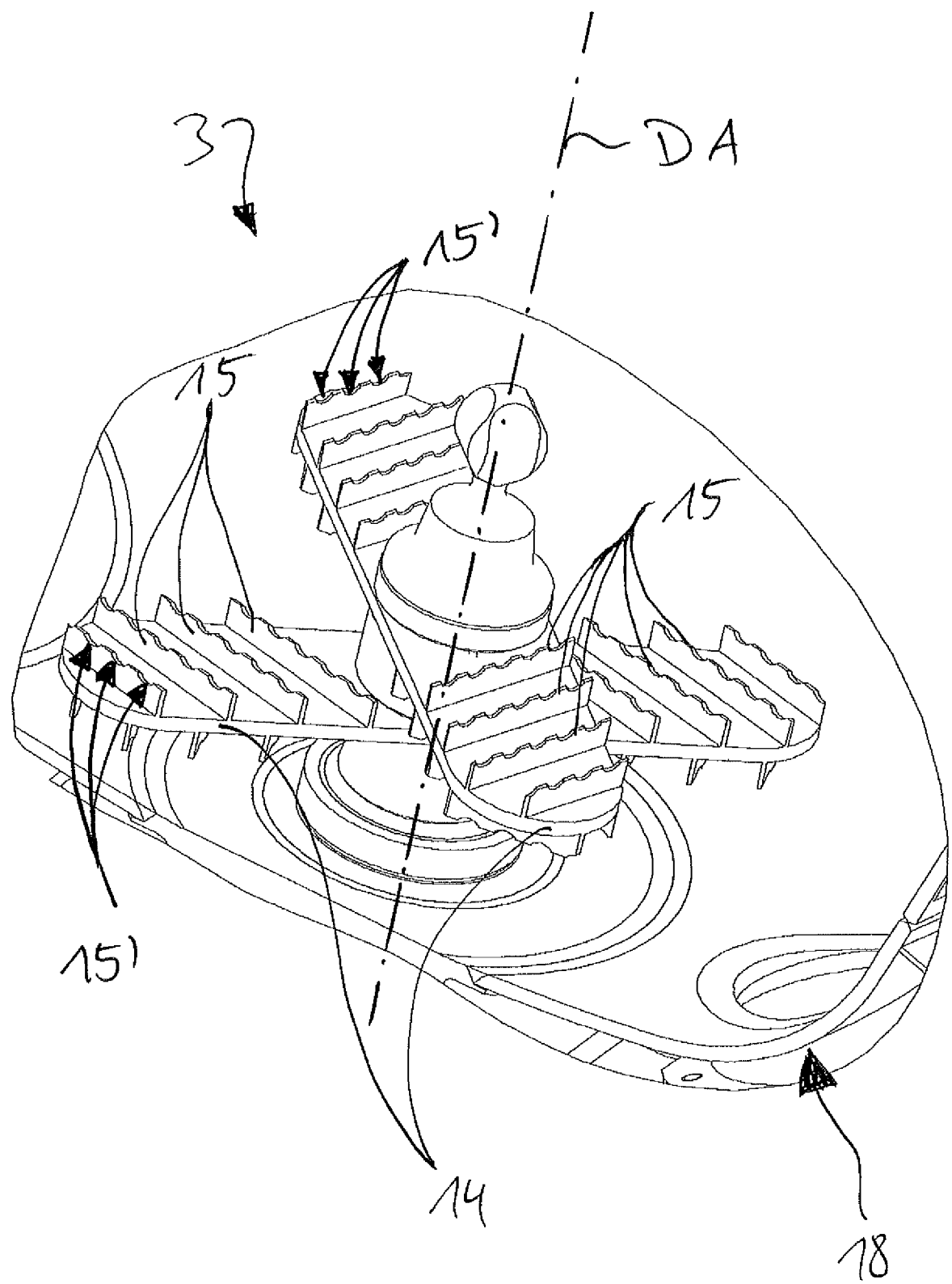
Figure 9:
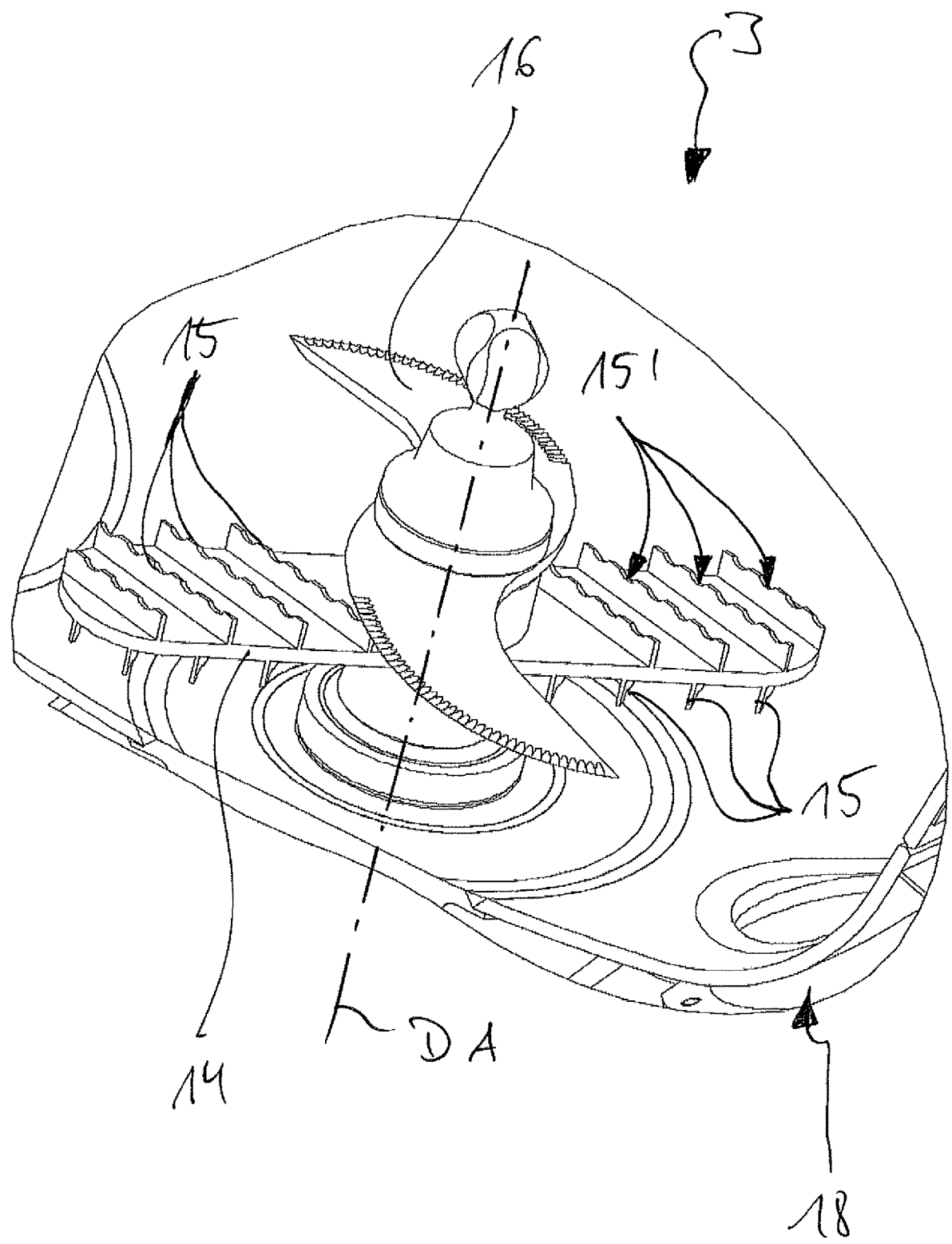
Figure 11:
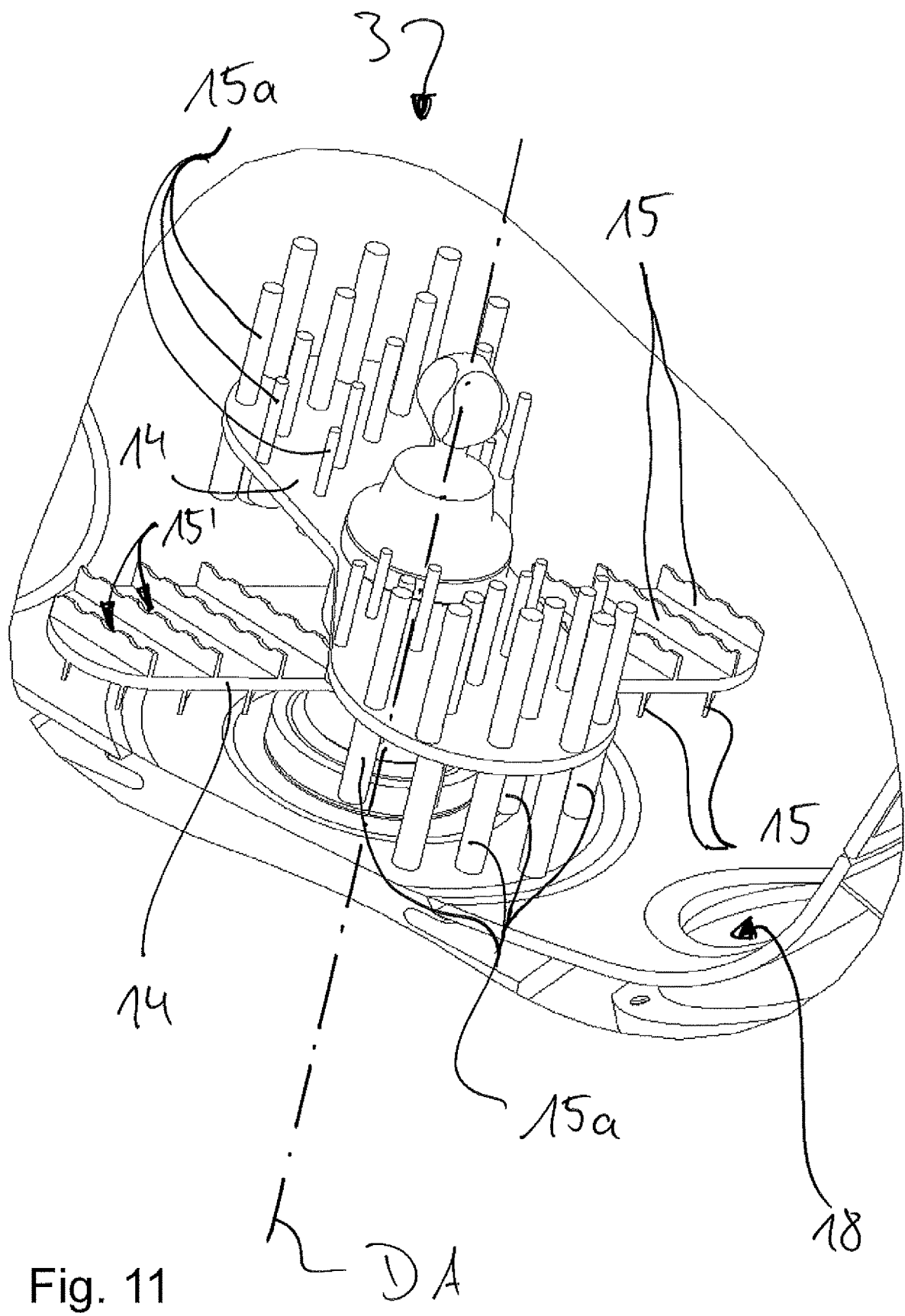

The invention will be described below by way of exemplary embodiments, only on the basis of examples, and with reference to the accompanying drawings, in which:

FIG. 1 is a schematic cross-sectional view of a first exemplary embodiment of a device for processing and treating chocolate, FIG. 2 is the first exemplary embodiment of the device for processing and treating chocolate based on FIG. 1 and shown schematically in a slightly rotated position with respect to the view in FIG. 1, FIG. 3 is a schematic cross-sectional view of a second exemplary embodiment of a device for processing and treating chocolate, FIG. 4 is a schematic partial sectional view of a third exemplary embodiment of a device for processing and treating chocolate, FIG. 5 is a schematic partial sectional view of a fourth exemplary embodiment of a device for processing and treating chocolate, FIG. 6 is a schematic partial sectional view of a fifth exemplary embodiment of a device for processing and treating chocolate, FIG. 7 is a schematic partial sectional view of a sixth exemplary embodiment of a device for processing and treating chocolate, FIG. 8 is a schematic partial sectional view of a seventh exemplary embodiment of a device for processing and treating chocolate, FIG. 9 is a schematic partial sectional view of an eighth exemplary embodiment of a device for processing and treating chocolate, FIG. 10*a* is a diagrammatic partial plan view of a ninth exemplary embodiment of a device for processing and treating chocolate, FIG. 10*b* is a diagrammatic partial plan view of a tenth exemplary embodiment of a device for processing and treating chocolate, FIG. 11 is a schematic partial sectional view of an eleventh exemplary embodiment of a device for processing and treating chocolate.

With reference to the exemplary embodiments and applications described below and illustrated in the drawings, the invention will be explained only by way of example, i.e., it is not limited to these exemplary embodiments and applications, or to the combinations of features within an exemplary embodiment and application. Process and device features likewise also follow from the device or process descriptions.

Individual features that are indicated and/or illustrated in connection with a specific embodiment are not limited to this embodiment or the combination with other features of this embodiment, but may be combined as far as technically feasible with any other variants, even if these are not disclosed separately in the present documents.

The same reference numerals in the individual figures and illustrations of the drawing designate the same or similar, or the same or similarly functioning components. Based on the illustrations in the drawing, features not provided with reference numerals also become obvious, independently of whether such features are described below. However, features that are comprised in the present description, but are not visible or illustrated in the drawing will be readily understood by those skilled in the art.

FIGS. 1 and 2 schematically illustrate in sectional drawings a first embodiment of a device 1 for processing and treating of chocolate. The chocolate-processing and treatment device 1 is based on a universal food and meal processing machine and comprises a container 2 and stirring means 3 disposed therein. The container 2 has a processing interior 2a, which is defined by a cylindrical wall 4 and an outwardly curved bottom 5, and is inclined, i.e., the center axis ZA of the cylindrical wall 4 or specifically the container 2 is inclined with respect to a vertical on the subsurface, upon which the device 1 is positioned, or specifically inclined with respect to the vertical.

The stirring means 3 comprise a conching tool 6, which is rotatably arranged at or near the bottom 5 or the lowest point of the processing interior 2a of the container 2 with respect to the vertical, and at least one stirring arm 7, which is rotatable about the center axis parallel to the cylindrical wall 4, from which it projects at least in the radial direction. The conching tool 6 rotates faster than the stirring Arm 7 during operation.

The high-speed conching tool 6, for which some embodiments will be explained in more detail below with reference to FIGS. 7-11, ensures fast and high input of frictional and shearing energy and thus heating and liquefaction (melting) of the chocolate mass. For processing foods and raw materials other than chocolate, the conching tool 6 may easily be replaced, e.g., by a knife (see, e.g., FIG. 9). The stirring arm 7, along with the inclined container 2, takes care of mixing, kneading (sloshing) and aerating the chocolate mass, but may be used for mixing, kneading (sloshing) and aerating other food and raw materials without any further modifications. The product or chocolate mass, or parts thereof, are raised above each stirring arm 7 and fall back into the residual mass due to gravity.

Several stirring arms 7 are included, in particular three stirring arms 7, and are preferably evenly distributed circumferentially. Each stirring arm 7 is provided with mixing/dividing tools 8, which protrude from the plane of rotation of the stirring arm 7. Furthermore, each stirring arm 7, at its off-axis end, comprises a scraper 9, which sweeps along the interior 4a of the cylindrical wall 4, and wipes or scrapes off product and possibly chocolate mass contained in the container 2, or more precisely its processing interior 2a, from this interior 4a of the cylindrical wall 4.

Due to the mixing/dividing tools 8 and/or the scraper 9 in conjunction with the inclined container 2, mixing, kneading (sloshing) and aeration of the chocolate mass by rotationally moving each stirring arm 7 is further improved, however, mixing, kneading (sloshing) and aerating other food and raw materials without further modifications is also possible. The product or chocolate mass, or parts thereof, are additionally raised above the mixing tools 8 and the scrapers or scraper paddles 9, and fall back into the residual mass due to gravity.

FIGS. 3 to 6 schematically illustrate in partial sectional drawings the second to fifth exemplary embodiments of the device 1 for processing and treating chocolate. In the second exemplary embodiment of the device 1 for processing and treating chocolate according to FIG. 3, radially comb-like mixers 11 project in turn from the stirring arm 7 rods 10, which extend substantially radially to the center axis with reference to the rods 10, specifically, the directions to the radius may extend obliquely, in particular with respect to the direction of the center axis, each consisting of a plurality of bars 12, at whose ends facing away from the rods 10, a mixing or stirring body 13 is seated. In the third embodiment of the device 1 for processing and treating chocolate according to FIG. 4, the bars 12 of the mixer 11 have a round cross-section, and in the fourth embodiment of the device 1 for processing and treating chocolate according to FIG. 5, the bars 12 of the mixer 11 have a polygonal, in particular rectangular, and especially square cross-section. The bars 12 of the mixer 11 in the fifth embodiment of the device 1 for processing and treating chocolate according to FIG. 6 [the bars 12 of the mixer 11] are blade-like and with contoured edges.

Preferably, the mixing/dividing tools 8 are designed and/or mounted and/or controlled, such that there is no risk of collision with the conching tool 6 in the path of the rotary motion of the stirring arms 7.

Referring again to FIGS. 1 and 2, the conching tool 6 comprises a rotatable blade 14, on which more preferably rib formations or ribs 15 projecting from the plane of rotation of the conching tool 6 are provided. The ribs 15 are arranged at an angle, in particular an acute angle, to the tangent of each circle described during the rotation of the blade 14, such that upon rotation of the blade 14, the surrounding chocolate mass is forced radially outward. This is particularly obvious in the partial schematic sectional view of the sixth embodiment in FIG. 7. Furthermore, with reference to the enlarged sectional and individual representation of the conching tool 6 in the context of the sixth exemplary embodiment according to FIG. 7, the blade 14 of the conching tool 6 extends on both sides of the latter's axis of rotation, and two blades 14 are contained and arranged in a cross arrangement, in particular offset or adjacent along the axis of rotation DA of the conching tool 6.

As is particularly obvious in FIGS. 1-3, the axes of rotation of conching tool 6 (axis of rotation DA) and stirring arms(s) 7 (center axis ZA) are not parallel, but extend at a particularly acute angle to one another. Furthermore, the conching tool 6 is arranged deeper in the container 2 than is each stirring arm 7, i.e., at or near the lowest point with respect to the vertical in the processing interior 2a of the container 2.

FIGS. 7-11 schematically illustrate in partial sectional drawings further exemplary embodiments of the device 1 for processing and treating chocolate. Specifically, these sixth to tenth exemplary embodiments differ in terms of the conching tool 6 design.

The variant of the sixth exemplary embodiment according to FIG. 7 was already described in detail above. In contrast to this sixth exemplary embodiment, in which the ribs or web shapes 15 are planar along their length and, furthermore, have smooth edges facing away from the respective blade 14, these edges are profiled in the seventh exemplary embodiment according to FIG. 8, in that recesses or indentations 15' are provided, whereby higher shear effects are achieved in the chocolate to be processed. In the eighth exemplary embodiment of the chocolate processing and treatment device 1 according to FIG. 9, a blade 14 is combined with a knife 16 arranged crosswise thereto in order to form the conching tool 6.

In principle, the ribs or web shapes 15 may be planar, wavy or stepped along their lengths and/or have a smooth or profiled free edge facing away from the respective blade 14, e.g., with the recesses or indentations 15'. Moreover, the ribs 15 may be arranged parallel or at angles to one another. An example of undulating rib or web shapes 15 is illustrated by the schematic representation of the ninth embodiment in FIG. 10a, and an example of the ribs 15 arranged at angles to one another is illustrated in the schematic representation of the tenth embodiment in FIG. 10b.

FIG. 11 illustrates in a schematic partial sectional view an eleventh exemplary embodiment of a device for processing and treating chocolate. Here, the two blades 14, each of which extend on either side of the axis of rotation DA of the conching tool 6 as corresponding blade arms 14a, are shaped differently. The lower blade 14 in FIG. 11 is, as in the seventh exemplary embodiment according to FIG. 8, provided with ribs or webs 15, whose edges facing away from the respective blade 14 are profiled, in that 15' recesses are provided. Specifically, the shape of this design is to be understood as the course of a "rectangular wave," however, it may also contain any other stepped or continuous uniform or random configurations of recesses or indentations 15'. The second upper blade in FIG. 11 is provided with pins 15 a, which are cylindrical and protrude parallel to the axis of rotation of the blades 14. Consequently, the pins 15a in the area of each of the free ends of the blade 14 on either side of its axis of rotation are longer and thicker than are the pins 15a in the area of the center of each of the two blade arms 14a, and finally pins 15a, which are nearest to the axis of rotation DA, are shorter and thinner than are the pins 15a in the area of the center of each of the two blade arms 14a.

Furthermore, the illustrations of the individual exemplary embodiments in FIGS. 7-11 show that the blades 14 preferably comprise the web shapes 15 and/or the pins 15a on each of their two flat sides, and the courses of the web shapes 15 and/or arrangements and shapes of the pins 15a may, if necessary, be different on the two flat sides of each blade, how [they] are mutually differently inclined with respect to the web shapes 15, or inclined in other directions relative to the tangent at the respective free end of the blade 14, whereby the specific inclined position is selected such that the shearing of the chocolate mass above and below each blade 14 is optimized [incomplete or ungrammatical German sentence].

Advantageously, the container 2 also contains a lid (not shown), which is adjustable between a closed position and open positions, thus allowing for a tight closure of the container 2, such that the influences of external air, external temperature, etc., may be reduced or avoided. The container 2 of the device 1 for the processing of chocolate is charged via the open lid or feed system 17, if necessary. Emptying is preferably done via a bottom seat valve 18 in or near the bottom 5 of the container 2. Odor, bitter and flavor components may be removed from the product via a vacuum system (not shown). Also, the container 2 may be heated or generally temperature-controlled. Controls or a central control (not shown) may be provided for any of the components and functions of the device.

The rotational movements of the conching tool 6 and stirring arms 7 are performed by correspondingly arranged and connected motors, in particular electric motors, which can be easily recognized in the figures by those skilled in the art, and which are advantageously controlled by any existing control devices adapted for the product and process, for which the device 1 is to be used.

The device 1 for processing and treating chocolate is advantageously based on a universal machine in accordance with one aspect of the present invention, of which some further features are listed below. Such universal machines are designed, e.g., for rational and economical production of dressings, pureed food and baby food, as well as sandwich spreads, liver pates and processed cheese, including pastes, meat emulsions, and the like. They usually cover a large process spectrum, including, e.g., crushing, dispersing and emulsifying, also under vacuum and preferably additionally supplemented, e.g., by direct steam heating or other heating and cooling options.

Accordingly, a universal machine for food and food processing may be used particularly advantageously as a device 1 for processing and treating chocolate, wherein the universal machine comprises a container 2 and stirring means 3 arranged therein, and wherein the container 2 has a processing interior 2a with a cylindrical wall 4 and an outwardly curved bottom 5, and is set up inclined, i.e., the center axis ZA of the cylindrical wall 4 is inclined with respect to the vertical, and the stirring means 3 comprise at least one stirring arm 7, which is rotatable about the center axis ZA of the cylindrical wall, while projecting from the center axis ZA of the cylindrical container 2 at least also in the radial direction. Moreover, the invention provides for the stirring means 3 to further comprise a conching tool 6, which is rotatably arranged at or near the bottom of the container 5, in particular at or near the lowest point of the container with respect to the vertical, and rotating faster than the stirring arm during operation.

The other preferred and advantageous embodiments will be apparent from the exemplary embodiments according to FIGS. 1-11.

For all exemplary embodiments and the device according to the invention for processing and treating chocolate, including the related method, and the corresponding use of a universal machine, some further embodiments are provided below.

The present invention skillfully uses in particular a combination of the high-speed conching tool 6 (particularly, its speed up to 3600 rpm of concentrated input of shearing energy) and a slow-mixing tool (mixing, shearing, kneading, sloshing), including an inclined (at a certain angle) container. A rotational speed of the conching tool 6 of 100 rpm and above, in particular 500 rpm and above, especially 1000 rpm and above, is referred to as high speed pursuant to the present application. The aforementioned exemplary maximum speed of up to 3,600 rpm for the conching tool 6 resulted from experiments involving some specific arrangements and machines. Moreover, related experiments for the final conching speeds of the conching tool 6 have shown that speeds between 500 and 1500 rpm or so were optimal, depending on the condition and composition of the specific chocolate mass or chocolate.

The conching tool 6 provides for fast and high input of friction and shear energy, and thus for heating and liquefaction of the product constituents, mainly during continuous circulation of the still fine-crumbed rolling stock, whereby frictional heat is generated and additional heating occurs, and during subsequent addition of, in particular, cocoa butter in order to make the mass even more flowable. Upon reaching a temperature of about 90° C. through conching, and the formation of a pasty mass, the speed is reduced to prevent the product temperature from exceeding 92° C.

The "slow mixing tool" in the form of the stirring arms 7 with various design options, in particular as described above with reference to the figures in the drawing, feed the recipe components to the conching tool 6 during continuous circulation of the still finely crumbled rolling stock and the subsequent addition of, in particular, cocoa butter (the usual speed of the stirring arms 7 is 10-15 rpm), and then assumes the further conching performance with speeds of the stirring arms 7 up to 50 rpm, in particular 20-30 rpm, by shearing the product on the wall 4, bottom 5 and conching tool 6, and "fall-down" kneading (due to the inclined container) during the further conching and addition of, in particular, cocoa butter and lecithin, as well as sloshing (while adding, in particular, cocoa butter and lecithin in order to increase the flowability, followed by the liquefaction phase). Specifically, this means that the speeds of for the stirring arms 7 are at a maximum of 50 rpm, while the speed of the high-speed conching tool 6 is from 100 rpm, preferably from 500 rpm and above.

The invention is illustrated in the specification by exemplary embodiments and in the drawing solely by way of example and is not limited thereto, but comprises all variations, modifications, substitutions and combinations, which those skilled in the art may infer from the present documents, in particular in the context of the claims and the general disclosures in the introductory part of this specification, as well as the specification and drawings of the embodiments, which they may combine based on their expert knowledge, as well as the prior art. In particular, all the individual features and design options of the possible embodiments may be combined with one another.

REFERENCE NUMERAL LIST

1 Device for processing and treating chocolate
2 Container
2a Processing interior
3 Stirrers
4 Wall
4a Inside of the cylindrical wall
5 Base
6 Conching tool
7 Stirring arm
8 Mixing/cutting tools
9 Scraper
10 Rods
11 Mixer
12 Bars
13 Stirring body
14 Blade
14a Blade arms
15 Ribs
15' Recesses or indentations
15a Pin
16 Knife
17 Feeding system
18 Bottom seat valve
ZA Center axis of the container with respect to the cylindrical wall and the rotational axis of the stirrers
DA Rotary axis of the conching tool

The invention claimed is:

1. A device for processing and treating chocolate, the device comprising:
a container having a processing interior that includes a cylindrical wall and an outwardly arched and inclined bottom, such that the cylindrical wall is inclined along the bottom with respect to a vertical, center axis of the container;
a stirring means arranged within the container, the stirring means comprising at least one stirring arm that is rotatable about the center axis, while projecting from the center axis in at least a radial direction; and
a conching tool positioned at or near the bottom of the container, the conching tool being rotatable around a rotary axis,
the conching tool comprising a rotatable blade and a motor configured to rotate the blade faster than the at least one stirring arm during operation of the device.

2. A device according to claim 1, wherein the rotary axis about which the conching tool rotates and an axis of rotation of the at least one stirring arm that coincides with the center axis of the container, are not parallel.

3. A device according to claim 1, wherein the conching tool is arranged in the container at or near a lowest point of the container with respect to the vertical direction, such that the conching tool is arranged at a lower position in the container than the at least one stirring arm.

4. A device according to claim 1, wherein the stirring means comprises a plurality of stirring arms that are arranged circumferentially and evenly distributed.

5. A device according to claim 4, wherein the stirring means comprises three stirring arms that are arranged circumferentially and evenly distributed.

6. A device according to claim 1, wherein the at least one stirring arm is provided with mixing/dividing tools projecting from a plane of rotation of the at least one stirring arm.

7. A device according to claim 1, wherein the at least one stirring arm comprises a scraper at an end of the at least one stirring arm, the scraper being configured to sweep along an inside of the cylindrical wall and to wipe or scrape any product contained in the container from the inside of the cylindrical wall.

8. A device according to claim 1, wherein at least one of ribs and web shapes projecting from a plane of rotation of the conching tool are provided on the rotatable blade.

9. A device according to claim 8, wherein the ribs are arranged at an angle relative to a tangent of a circle defined by each of the ribs during rotation of the rotatable blade, such that upon rotation of the rotatable blade, any surrounding chocolate mass is forced radially outward.

10. A device according to claim 9, wherein the ribs are arranged at an acute angle relative to the tangent of a circle defined by each of the ribs during the rotation of the rotatable blade.

11. A device according to claim 8, wherein the at least one of ribs and web shapes is at least one of (i) planar, wavy or stepped along their length and (ii) smooth or profiled along free edges facing away from the rotatable blade.

12. A device according to claim 8, wherein the ribs are arranged parallel or at angles relative to one another.

13. A device according to claim 1, wherein the rotatable blade of the conching tool extends on either side of the rotary axis about which the conching tool rotates and contains blade arms extending diametrically from the rotary axis.

14. A device according to claim 1, wherein the conching tool comprises two rotatable blades that are arranged (i) in a cross arrangement and (ii) spaced apart or adjacent in an axial direction of the rotary axis of the conching tool.

15. A method for processing and treating chocolate, wherein a starting mass or an intermediate product of chocolate is filled in an inclined cylindrical container and rotates therein along with at least one stirring arm rotating about this center axis, while projecting from the center axis of the cylindrical container at least also in the radial direction above this center axis, as well as processed simultaneously by means of a rotatable conching tool, which rotates faster than the at least one stirring arm about an axis of rotation, which is inclined relative to the center axis of the cylindrical container.

* * * * *